(12) United States Patent
Hartwig et al.

(10) Patent No.: US 9,427,792 B2
(45) Date of Patent: *Aug. 30, 2016

(54) METHOD FOR PRODUCING AND ASSEMBLING SUPERHEATER TUBES OF STEAM GENERATORS

(75) Inventors: Ruben Hartwig, Esslingen (DE); Andreas Helmrich, Remshalden (DE); Daniel Mutter, Stuttgart (DE); Alois Schalk, Weinberg-Aurach (DE)

(73) Assignee: ALSTOM TECHNOLOGY LTD., Baden (CH)

( * ) Notice: Subject to any disclaimer, the term of this patent is extended or adjusted under 35 U.S.C. 154(b) by 368 days.

This patent is subject to a terminal disclaimer.

(21) Appl. No.: 12/584,608

(22) Filed: Sep. 9, 2009

(65) Prior Publication Data

US 2010/0065159 A1 Mar. 18, 2010

(30) Foreign Application Priority Data

Sep. 16, 2008 (DE) .................. 10 2008 047 330

(51) Int. Cl.
*C21D 8/10* (2006.01)
*B21D 53/06* (2006.01)
(Continued)

(52) U.S. Cl.
CPC .............. *B21D 53/06* (2013.01); *B21D 53/08* (2013.01); *B23K 35/3033* (2013.01); *B23P 15/26* (2013.01);
(Continued)

(58) Field of Classification Search
CPC .............................. B21D 53/06; B21D 53/08
USPC ......................... 29/890.53, 890.54; 148/519
See application file for complete search history.

(56) References Cited

U.S. PATENT DOCUMENTS 2,084,889 A * 6/1937 Blevins ...................... 219/59.1
2,763,923 A    9/1956 Webb
(Continued)

FOREIGN PATENT DOCUMENTS

CN 1715722 A 1/2006
CN 1796044 A 7/2006
(Continued)

OTHER PUBLICATIONS

Unofficial English translation of Office Action and Search Report issued in connection with corresponding CN Application No. 200910173541.3 on Feb. 21, 2013.
(Continued)

*Primary Examiner* — Rebecca Lee
(74) *Attorney, Agent, or Firm* — GE Global Patent Operation; Stephen G. Midgley

(57) ABSTRACT

A method for producing superheater tubes and connecting pipes and assembling superheater tubes inside a steam generator tube wall includes preparing tubes composed of precipitation-hardened nickel-based alloys in a solution-annealed state for the straight tubes, the bends, and the connecting pipes in a workshop and preparing sleeves composed of a material that is not to be heat treated in a shop. The bends and the connecting pipes are manufactured in the workshop using bending tools and then the straight tubes, the bends and the connecting pipes are precipitation hardened in the workshop in a first heating device. The superheater tubes are manufactured in the workshop by connecting the straight tubes and the bends with weld seams, and connecting the sleeves with the connecting pipes with weld seams. The weld seams between straight pipes and bends as well as the weld seams between sleeves and connecting pipes are precipitation hardened in the workshop with a second heating devices. The superheater tubes are connected with the connecting pipes on the assembly site inside the steam generator tube walls with a weld seam and the sleeves are connected with the take-up device with a weld seam. The weld seams are precipitation hardened on the assembly site with third heating devices located proximate to the weld seams.

10 Claims, 4 Drawing Sheets

(51) Int. Cl.
    B21D 53/08    (2006.01)
    B23K 35/30    (2006.01)
    B23P 15/26    (2006.01)
    C22F 1/10     (2006.01)
    F22G 7/12     (2006.01)
    F28D 7/08     (2006.01)
    F28F 9/26     (2006.01)
    F28F 21/08    (2006.01)
    C21D 6/02     (2006.01)

(52) U.S. Cl.
    CPC . *C22F 1/10* (2013.01); *F22G 7/12* (2013.01);
        *F28D 7/08* (2013.01); *F28D 7/085* (2013.01);
        *F28F 9/26* (2013.01); *F28F 21/087* (2013.01);
        *B23K 2201/14* (2013.01); *B23K 2203/08*
        (2013.01); *C21D 6/02* (2013.01)

(56) References Cited

U.S. PATENT DOCUMENTS

| | | | |
|---|---|---|---|
| 3,941,590 A * | 3/1976 | Watanabe | 420/449 |
| 4,209,058 A * | 6/1980 | Spalding | 164/100 |
| 4,288,109 A | 9/1981 | Ellis | |
| 4,639,992 A | 2/1987 | Stol et al. | |
| 5,059,257 A * | 10/1991 | Wanner et al. | 148/607 |
| 5,816,479 A * | 10/1998 | Matherne et al. | 228/182 |
| 6,666,945 B1 * | 12/2003 | Andtbacka et al. | 156/304.2 |
| 2005/0072500 A1 | 4/2005 | Cao et al. | |
| 2008/0318078 A1 * | 12/2008 | Matsubara et al. | 428/615 |

FOREIGN PATENT DOCUMENTS

| | | |
|---|---|---|
| CN | 101029379 A | 9/2007 |
| EP | 0 478 374 | 4/1992 |
| EP | 0 819 775 | 1/1998 |
| JP | H0882455 | 3/1996 |
| JP | 2002257496 | 9/2002 |
| WO | 9718428 A1 | 5/1997 |
| WO | 03100340 A1 | 12/2003 |
| WO | WO 2005090862 A1 * | 9/2005 |

OTHER PUBLICATIONS

Unofficial translation of Chinese Office Action and Search Report issued in connection with related CN Application No. 200910173540.9 on Jan. 24, 2013.

* cited by examiner ive this solution and its variations, the present invention results in the following advantages:
METHOD FOR PRODUCING AND ASSEMBLING SUPERHEATER TUBES OF STEAM GENERATORS

BACKGROUND

The invention relates to a method for producing and assembling superheater tubes of steam generators.

Superheater tubes are primarily used in steam generators of power plants that are heated with fossil fuels. In conjunction with that, the superheater tubes are arranged as heating surfaces in a gas flue which is surrounded by tube walls and which is located upstream, as viewed in the direction of flow of the combustion exhaust gas, of the combustion chamber which is constructed with burners, whereby the cross section of the gas flue and the combustion chamber is constructed in rectangular fashion in most cases. The tubes of the superheater tubes, which are formed of welded straight tubes and bends and possibly additional weld-on parts, carry within them a working medium heated by means of the combustion of the fossil fuel and superheated in the superheater tubes and pass it on to further processes. In the case of the known welded superheater tubes, usually 9-12% chromium steels are used with subsequent heat treatment, and/or austenitic steels with non-precipitation-hardened nickel-based alloys in a solution-annealed state that do not as a rule require heat treatment.

The desire for steam generators with higher efficiencies and the resulting development of the "700° C. power plant" with regard to the steam working medium in order to increase efficiency, which, among other things, help to decrease the emission of CO2 into the atmosphere, leads to an increase of the steam parameters of the steam generator, among other things. Achieving or realizing higher steam parameters, i.e., higher pressures and temperatures of the steam working medium, places high requirements on the materials that are to be used in the steam generator. The materials that are being used at the present time are unable to meet these requirements. Further development of the materials and their processing is thus unavoidable. Precipitation-hardened nickel-based alloys lend themselves as suitable materials for the realization of higher steam parameters in superheater tubes. In every case, these types of alloys require heat treatment of the complete tube, both the weld and bend areas as well as the basic tube of the superheater tubes.

The task of the present invention is to suggest a method for producing and assembling superheater tubes of steam generators in which the production and assembly takes place in a more efficient and practical way. In particular, it is the task of the invention to develop a method for the manufacturing and assembly sequence, as well as, in particular, the heat treatment of superheater tubes and their connecting pipes made primarily from precipitation-hardened nickel-based alloys, whereby this method should also include concepts in which a time-consuming heat treatment can be dispensed with or can at least be kept to a minimum.

SUMMARY

Through the inventive solution, a method for producing superheater tubes of steam generators is created that has the following advantages:
  Efficient and practical feasibility of the production of superheater tubes of steam generators,
  Raising steam generator efficiency through realization of higher steam parameters,
  Reducing the emission of CO2 into the atmosphere by raising steam generator efficiency.

An advantageous further development of the invention provides that after their manufacture and before the manufacture of the individual superheater tubes, the bends and the bent connecting pipes are solution-annealed in a third heating device. By doing this, any influences on the material microstructure from the cold forming can be eliminated.

In an advantageous development of the invention, during manufacture of the individual superheater tubes the top and the bottom straight tubes of a superheater tube are constructed with a wear-resistant layer. Erosion of the top and bottom tubes of the superheater tube, which can otherwise occur for example due to the soot blowing of the superheater tubes, can be prevented by the wear-resistant layer.

Another advantageous development of the invention provides that the precipitation hardening takes place at a temperature of 785° C. to 815° C., and in another advantageous further development of the invention, the precipitation hardening extends over a time span of about 4 hours. Proper precipitation hardening of the components to be heat treated is assured in this way.

It is advantageous to carry out the solution annealing at a temperature of 1105 to 1135° C., and in another advantageous further development of the invention, the solution annealing is performed for several minutes. Proper solution annealing of the components to be heat treated is assured in this way.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
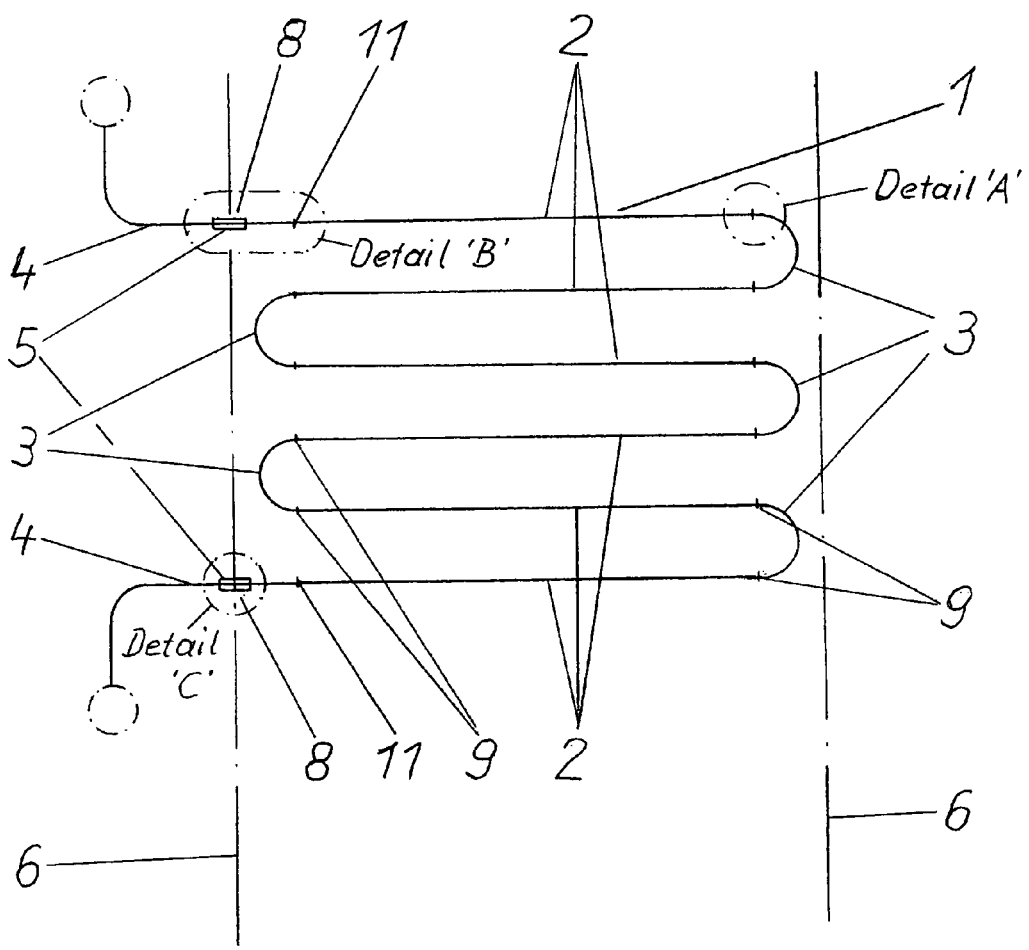
FIG. 1 is a schematic view of a superheater tube (heating surface) inside the tube walls of a steam generator with connecting pipes to the indicated distributors and collectors.

FIG. 1 shows a schematic illustration of an example of a superheater tube or superheater heating surface 1 completely produced and arranged and mounted inside the tube walls 6 of a steam generator (not shown), including the connecting pipes 4 that penetrate the tube walls 6. For the sake of clarity, reference is made to the fact that a multiplicity of the one superheater tube 1 illustrated in FIG. 1 is arranged inside the tube walls 6. The superheater tube 1 is made in the workshop of a number of straight tubes 2 and bends 3, and is welded at the construction site, i.e., on the assembly site, with the connecting pipes 4 that penetrate the tube walls 6. The connecting pipes 4 themselves are connected outside of the tube walls 6 with distribution and collection devices, not shown, by means of which the working medium circulating inside the steam generator, as a rule, water or steam or a mixture of water and steam, can be directed to and from the superheater tubes 1. The method for producing the superheater tubes 1 has the following steps:

First, the straight tubes 2 and additional straight tubes that are made into bends 3 and connecting pipes 4 in a later method step are prepared. In order to meet the high requirements on the material of the previously mentioned components 2, 3, 4 resulting from the increased steam parameters, precipitation hardened nickel-based alloys that are in a solution-annealed state are prepared for the components 2, 3, 4 mentioned above. As a rule, the tube diameters and the wall thicknesses of the tubes used for the bends 3 and connecting pipes 4 match the diameter and wall thickness of the straight tubes 2. In addition, sleeves 5 are prepared that are made of a material that does not have to be heat treated. In conjunction with that, the inside diameters of the sleeves Shave a slightly larger diameter than the outside diameter of the connecting pipe 4 in order to be able to slip or mount the sleeve 5 onto an outside of an intermediate portion of the connecting pipe 4. The length of the sleeve 5 is advantageously made somewhat longer than that of the sleeve 7 that is arranged in the tube wall 6 and is provided as a take-up means and for the connection of sleeve 5 (see FIG. 3, upper half of the longitudinal cross section). As a result of the offset of these two sleeves 5, 7, an easily applied fillet weld can be placed during subsequent welding of the two sleeves 5, 7. In place of the sleeve 7, a filler plate 15 inserted in the tube wall 6 to fill out a tube bend can also be used as a take-up means of the connecting pipe 4 and its sleeve 5 (see FIG. 3, lower half of the longitudinal cross section). Both the sleeve 7 and the filler plate 15 are designed from a material that is not to be heat treated.

What is sought or meant with regard to the employment or use of materials that are not to be heat treated are materials that do not have to be annealed or post-weld heat treated after they have been welded.

In the next method step, the straight tubes that have been prepared for the bends 3 and connecting pipes 4 are processed into bends 3 and connecting pipes 4 with tools that are suitable for the purpose, e.g., bending presses. As a rule, the bends 3 exhibit a 180° bend and the connecting pipes 4 exhibit a bend of 90°. For the subsequent welding of the straight tubes 2 with the bends 3 and the connecting pipes 4, welding chamfers are provided on their respective ends.

Following the manufacture of the straight tubes 2, the bends 3 and the connecting pipes 4, as the next method step these components are precipitation hardened in the workshop in a first heating device, not shown. Used as the first heating device as a rule is a furnace adapted for the purpose based on the dimensions of the straight tubes 2, the bends 3 and the connecting pipes 4, in which the straight tubes 2, the bends 3 and the connecting pipes 4 are heat treated individually or in groups. Provision is thus made in accordance with the invention that all of the straight tubes 2, bends 3 and connecting pipes 4 are already precipitation hardened in the workshop, and thus no additional effort is required in this regard on the assembly site, i.e., at the construction site. The precipitation hardening of the components mentioned above inside the first heating device is advantageously carried out at a temperature of 785° C. to 815° C., and additionally advantageously over a time span of about 4 hours, whereby this can deviate within the minute range.

In the following method step, the individual superheater tubes 1 are manufactured, in that in accordance with FIG. 2 the straight tubes 2 are connected with the bends 3 by means of butt welds 9, welded in the workshop. In addition, in accordance with FIG. 3a sleeve 5 made of a material that is not to be heat treated is mounted externally on each of the connecting pipes 4 in the penetration area 8 of each of the connecting pipes 4 at the steam generator tube wall 6, and is connected with the connecting pipe 4 by means of a weld seam 10, welded in the workshop. The position or locality of the penetration area 8 of the connecting pipes 4 at the tube wall 6 can be easily determined in advance, since the center-to-center distances of the tube walls 6 relative to each other, and the dimensions and position of the superheater tubes 1 including the connecting pipes 4 fastened on them are known exactly. Thus, the position of the sleeve 5 on the connecting pipe 4 is predetermined exactly.

Figure 2:
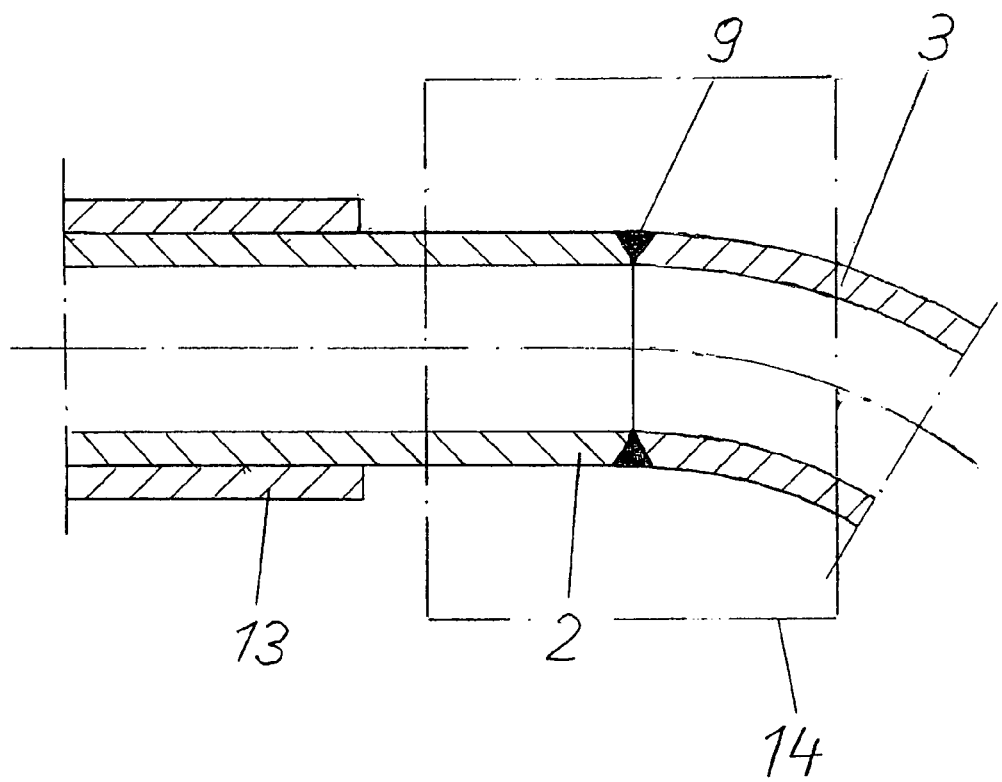
FIG. 2 is detail "A" from FIG. 1, shown schematically in a longitudinal cross section.
Figure 4:
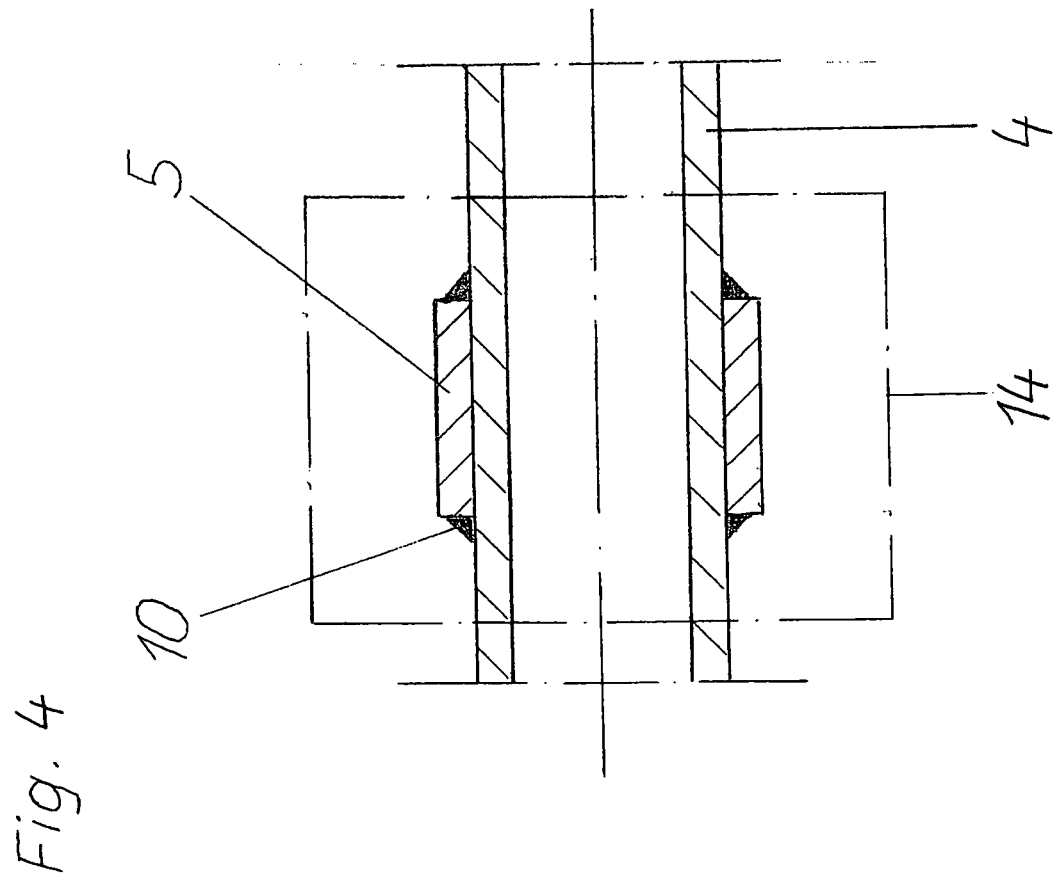
FIG. 4 is detail "C" from FIG. 1, shown schematically in a longitudinal cross section.

Following the production or completion in the workshop of the superheater tubes 1 and the connecting pipes 4 fitted with sleeves 5, in the next method step, also in the workshop, the butt welds 9 of the superheater tubes 1 and the fillet welds 10 between connecting pipes 4 and sleeves 5 are precipitation hardened at the weld seams 9, 10 by means of locally applied second heating devices 14 (cf. FIGS. 2 and 4). The second heating devices 14 can also be resistance annealing cassettes that are geometrically adapted and locally used and that heat treat or precipitation harden the area of the weld seam 9, 10. The size of the precipitation hardening area and its parameters, i.e., the thermal transfer area and the heating and cooling gradients, are exactly defined in advance in accordance with the requirements. As with the precipitation hardening in the workshop of the straight tubes 2, the bends 3 and the connecting pipes 4, here again the precipitation hardening advantageously takes place at a temperature of 785° C. to 815° C., and additionally advantageously, over a time span of about 4 hours, whereby this can deviate with the minute range. With the precipitation hardening of the weld seams 9, 10 that has now been carried out in the workshop and the precipitation hardening of the straight tubes 2, the bends 3 and the connecting pipes 4 that has already taken place in an earlier method step, provision is thus made in accordance with the invention that the superheater tubes 1 and their butt welds 9, as well as the connecting pipes 4 fitted with sleeves 5 and their weld seams 10, are already precipitation hardened in the workshop and thus and thus no additional effort is required in this regard at the construction site, i.e., on the assembly site.

Following completion of the method step mentioned above, the superheater tubes 1 and the connecting pipes 4 fitted with sleeves 5 can be brought to the construction site where they are installed into a steam generator, not shown, and in conjunction with that the two components are connected to each other. For that purpose, in the next method step, at the construction site, i.e., on the assembly site, the connecting pipes 4 fitted with sleeves 5 are inserted through the tube walls 6 of a steam generator, not shown, that have already been created and assembled. For that purpose, in accordance with FIG. 3 sleeves 7 or filler plates 15 are provided at the penetration areas 8 at the tube walls 6 for receiving the connecting pipes 4 and their sleeves 5. In the interest of simplified assembly or connection of the connecting pipes 4 and their sleeves 5 with the tube wall 6, the sleeves 7 or filler plates 15 that are connected with the tube wall 6 are provided from a materials that is not to be heat treated. Following the insertion of the connecting pipes 4 and their sleeves 5 through the tube wall 6 or its sleeves 7 or filler plates 15, the connecting pipe 4 is connected on the assembly site with the superheater tube 1 by means of a butt weld 11, and subsequently the sleeve 5 of the connecting pipe 4 is connected on the assembly site with the sleeve 7 (upper half of the longitudinal cross section of FIG. 3) or the filler plate 15 (lower half of the longitudinal cross section of FIG. 3) of the tube wall 6 by means of weld seam 12.

Figure 3:
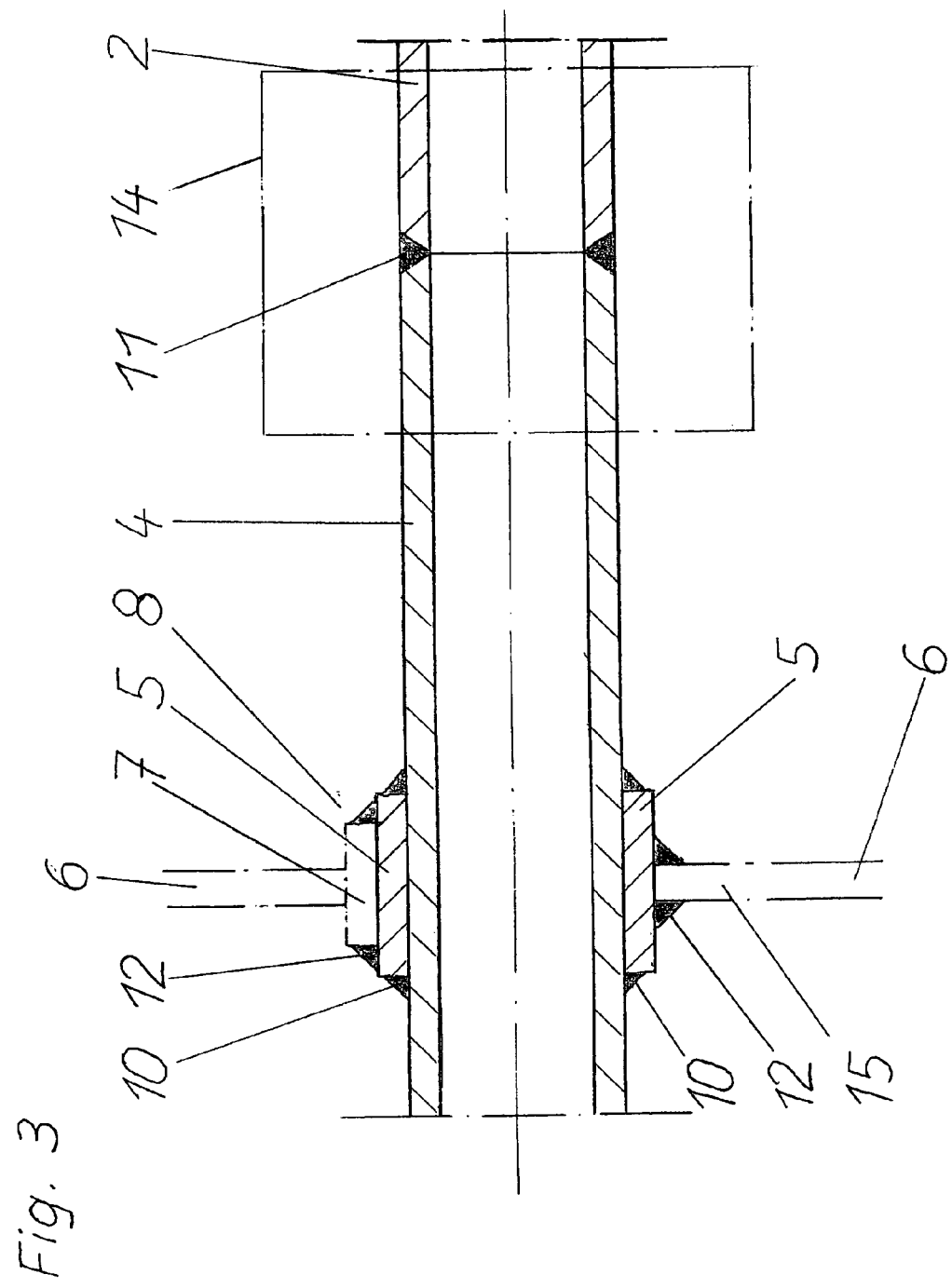
FIG. 3 is detail "B" from FIG. 1, shown schematically in a longitudinal cross section.

Finally, the butt welds 11 are precipitation hardened at the construction site, i.e., on the assembly site, by means of second heating devices 14 mounted locally at the weld seams 11 (cf. second heating device 14 illustrated in dashed lines in FIG. 3). The size of the precipitation hardening area and its parameters, i.e., the thermal transfer area and the heating and cooling gradients, are exactly determined in advance in accordance with the requirements. As with the precipitation hardening in the workshop of the weld seams 9, 10, here again the precipitation hardening advantageously takes place at a temperature of 785° C. to 815° C., and additionally advantageously, over a time span of about 4 hours, whereby this can deviate with the minute range. As was already mentioned above, the second heating device 14 can also be geometrically adapted and locally use resistance annealing cassettes that heat treat or precipitation harden the area of the weld seam 11.

The weld seams 12 of the assembly site connection of the sleeves 5 (connecting pipe 4) with the sleeves 7 or filler plate 15 (tube wall 6) do not have to be heat treated, since according to the invention, sleeves 5 that are made of a material that does not have to be heat treated after welding have been placed on the connecting pipes 4. In terms of material, the same holds true with regard to the sleeves 7 or filler plates 15 already inserted into the tube wall 6 during the manufacture of the tube wall 6.

In order to be able to better and more quickly dissipate the heat that occurs during the welding of the tubes made of precipitation-hardened nickel-based alloy, i.e., the straight tubes 2 with the bends 3 (weld seams 9) and the superheater tubes 1 and thus the straight tubes 2 with the connecting pipes 4 (weld seams 11), cooling elements, not shown, can be applied in close proximity or at the peripheries of said weld seams 9 and 11. They can be, for example, tubes that are wound around the straight tubes 2, bends 3 and connecting pipes 4 and carry a cooling medium. As a result of the better and quicker dissipation of the heat that occurs during welding, an accumulation of heat on the tubes made of precipitation-hardened nickel-based alloys is prevented, and thus heat cracks are avoided.

Preferably, Alloy 740 from Special Metals or Alloy 263 (Material no. 2,4650) is used for the straight tubes 2, bends 3 and connecting pipes 4 that are made of precipitation-hardened material. At the present time, the Alloy 740 material possesses neither a European certification of material nor a VdTÜV [Association of Technical Inspection Agencies] certification, and is qualified for use in steam power plants or steam generators by means of particular material appraisal.

Preferably, Alloy 617 mod (NiCr23Co12Mo mod.) or Alloy 617 (NiCr23Co12Mo) is used for the components that are made of a material that is not to be heat treated (sleeves 5, sleeves 7, filler plates 15).

Preferably, a welding filler material of the same kind is used for welding to each other the straight tubes 2, bends 3 and connecting pipes 4 that are made of precipitation-hardened material.

Preferably, a welding filler material of the same kind is used for welding to each other the sleeves 5 and sleeves 7 or filler plates 15 that are made of a material that is not to be heat treated.

Preferably, a welding filler material made of a material that is not to be heat treated is used for welding the connecting pipes 4 that are made of a precipitation-hardened material with the sleeves 5 that are made of a material that is not to be heat treated.

In the event that the top and bottom straight tubes 2 of the superheater tubes 1 are to be protected against erosion, wear-resistant layers 13 can advantageously be applied to the relevant tubes of the superheater tubes 1. The application of this wear-resistant layer 13 advantageously takes place with the manufacture of the individual superheater tubes 1 (method step c)), whereby either sleeves are shrunk onto the straight tube 2 as the wear-resistant layers 13, or the straight tube 2 undergoes build-up welding several millimeters thick. A nickel-based alloy or heat-resisting chromium-nickel steels can be used as the material for the wear-resistant layer 13.

As an alternative or in addition, following their manufacture and prior to the manufacture of the individual superheater tubes 1, the bends 3 and the bent connecting pipes 4 can preferably be solution annealed in a third heating device, not shown, at a temperature of 1105° C. to 1135° C. and for a period of several minutes. A furnace, not shown, that has been adapted for that purpose can be used. By doing this, any influence on the material microstructure from the cold forming can be eliminated.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for producing superheater tubes and connecting pipes and assembling superheater tubes inside a steam generator tube wall, where each of the superheater tubes is formed from straight tubes and bends and each of the connecting pipes includes a sleeve mounted on the outside of the connecting pipe, the method comprising the following steps:
 a) preparing tubes for the straight tubes, tubes for the bends, and tubes for the connecting pipes in a workshop, as well as sleeves consisting of a material that is not to be heat treated, the tubes consisting of precipitation-hardened nickel-based alloys in a solution-annealed state;
 b) manufacturing the bends and the connecting pipes in the workshop using bending tools;
 c) precipitation hardening the straight tubes, the bends and the connecting pipes in the workshop in a first heating device;
 d) manufacturing the superheater tubes in the workshop by connecting the straight tubes and the bends with weld seams, and
 connecting the sleeves mounted on the outside of an intermediate portion of the connecting pipes, in a penetration area of the connecting pipe at the steam generator tube wall, with weld seams;
 e) precipitation hardening the weld seams between straight tubes and bends as well as the weld seams between sleeves and connecting pipes in the workshop with second heating devices disposed proximate to the weld seams;
 f) connecting the superheater tubes with the connecting pipes on the assembly site inside the steam generator tube walls with a weld seam and connecting the sleeves with a take-up device with a weld seam, the take-up device having been prepared in the steam generator tube walls and being made of a material that is not to be heat treated; and
 g) precipitation hardening the weld seams between the superheater tubes and the connecting pipes on the assembly site with third heating devices disposed proximate to the weld seams.

2. The method of claim 1 further comprising solution annealing the bends and the bent connecting pipes in the workshop after their manufacture and prior to the manufacture of the superheater tubes.

3. The method of claim 1 wherein step d further comprises constructing the top and bottom straight tubes of the superheater tube with a wear-resistant layer.

4. The method of claim 1 wherein step d takes place at a temperature of 785° C. to 815° C. and extends over a period of time substantially equal to 4 hour.

5. The method of claim 2 wherein solution annealing takes place at a temperature of 1105° C. to 1135° C. and extends over a period of time of several minutes.

6. The method of claim 1 further comprising preparing a sleeve or a filler plate as a take-up device.

7. The method of claim 1 further comprising using a welding filler material comprising precipitation-hardened nickel-based alloys for welding together the straight tubes, bends and connecting pipes that are made of precipitation-hardened nickel-based alloys.

8. The method of claim 1 further comprising using a welding filler material comprising a material that is not to be heat treated for welding together the sleeves and take-up device that are made of a material that is not to be heat treated.

9. The method of claim 1 further comprising using a welding filler material comprising a material that is not to be heat treated for welding the connecting pipes that are made of a precipitation-hardened material with the sleeves that are made of a material that is not to be heat treated.

10. The method of claim 1 further comprising cooling the straight tubes, bends and connecting pipes that are to be connected with butt welds at the peripheries of the butt welds and during the welding with cooling elements.

\* \* \* \* \*